United States Patent [19]

Müller

[11] Patent Number: 5,349,275

[45] Date of Patent: Sep. 20, 1994

[54] BRUSHLESS DIRECT CURRENT MOTOR

[75] Inventor: Rolf Müller, St. Georgen, Fed. Rep. of Germany

[73] Assignee: Papst Licensing GmbH, Spaichingen, Fed. Rep. of Germany

[21] Appl. No.: 126,677

[22] Filed: Sep. 24, 1993

Related U.S. Application Data

[63] Continuation of Ser. No. 928,976, Aug. 12, 1992, abandoned, which is a continuation of Ser. No. 448,760, Dec. 11, 1989, abandoned, which is a continuation of Ser. No. 177,692, Apr. 5, 1988, abandoned, which is a continuation of Ser. No. 79,100, Jul. 29, 1987, abandoned, which is a continuation of Ser. No. 635,251, Jul. 27, 1984, abandoned, which is a continuation-in-part of Ser. No. 447,688, Dec. 7, 1982, Pat. No. 4,535,275.

[30] Foreign Application Priority Data

Dec. 23, 1991 [DE] Fed. Rep. of Germany ....... 3150922
Dec. 23, 1991 [DE] Fed. Rep. of Germany ....... 3150923

[51] Int. Cl.$^5$ .................................................. H02P 6/02
[52] U.S. Cl. ..................................... 318/254; 318/138
[58] Field of Search ................... 318/138, 254, 439

[56] References Cited

U.S. PATENT DOCUMENTS

| | | | |
|---|---|---|---|
| 3,559,013 | 1/1971 | Burch et al. | 318/138 |
| 3,559,014 | 1/1971 | Rakes | 318/138 |
| 3,873,898 | 3/1975 | Müller | 318/138 |
| 3,887,844 | 6/1975 | Yoshida | 318/254 A X |
| 3,898,544 | 8/1975 | Tanikoshi | 318/254 |
| 3,909,690 | 9/1975 | Sugiura | 318/138 |
| 3,988,652 | 10/1976 | Endo et al. | 318/254 A X |
| 4,070,606 | 1/1978 | Morozumi et al. | 318/254 A |
| 4,105,940 | 8/1978 | Kuhnlein | 318/254 A X |
| 4,119,895 | 10/1978 | Muller | 318/254 |
| 4,135,120 | 1/1979 | Hoshimi et al. | 318/722 X |
| 4,292,575 | 9/1981 | Kuhnlein et al. | 318/254 |
| 4,296,362 | 10/1981 | Beasley | 318/439 X |
| 4,347,464 | 8/1982 | Park et al. | 318/439 X |
| 4,356,437 | 10/1982 | Saito et al. | 318/439 X |
| 4,365,187 | 12/1982 | McDaniel et al. | 318/254 |
| 4,393,339 | 7/1983 | Kimura | 318/254 |
| 4,403,174 | 9/1983 | Miyazaki et al. | 318/138 X |
| 4,449,081 | 5/1984 | Doemen | 318/254 |
| 4,484,114 | 11/1984 | Ebbs | 318/138 |
| 4,535,275 | 8/1985 | Müller | 318/254 |

FOREIGN PATENT DOCUMENTS

| | | | |
|---|---|---|---|
| 56-19394 | 2/1981 | Japan | 318/254 |
| 56-159986 | 12/1981 | Japan | 318/254 |
| 1528573 | 10/1978 | United Kingdom | 318/254 |

Primary Examiner—Bentsu Ro
Attorney, Agent, or Firm—Fitch, Even, Tabin & Flannery

[57] ABSTRACT

The stator winding of a brushless D.C. motor receives two current pulses per 360°-el. of rotor rotation, each current pulse being furnished via a respective current path. Each current path contains at least one power transistor switch having conductive and non-conductive states. These states are determined by respective driver transistor switches; when the driver transistor switch is in a high-output-impedance state the respective power transistor switch is rendered conductive, but when in the low-output-impedance state it renders the power transistor switch non-conductive. In various ways disclosed herein measures are taken to prevent the power transistor switches of both current paths from being simultaneously conductive. This may be accomplished using inherent or discrete base-emitter capacitances so connected that a power transistor switch is switched off abruptly but switches-on only after the elapse of a predetermined delay. Alternatively, the Hall voltage produced by the motor's rotor-position-sensing Hall cell may be applied to comparators such that the power transistor switches are not even commanded to conduct except during respective periods each shorter than 180°-el.

9 Claims, 6 Drawing Sheets

BRUSHLESS DIRECT CURRENT MOTOR

This application is a continuation of application Ser. No. 07/928,976, filed Aug. 12, 1992, abandoned; which is a continuation of application Ser. No. 07/448,760, filed Dec. 11, 1969, abandoned; which is a continuation of application Ser. No. 07/177,692, filed Apr. 5, 1988, abandoned; which is a continuation of application Ser. No. 07/079,100, filed Jul. 29, 1987, abandoned; which is a continuation of application Ser. No. 06/635,251, filed Jul. 27, 1984, abandoned; which is a continuation-in-part of application Ser. No. 06/447,688, filed Dec. 7, 1982, now U.S. Pat. No. 4,535,275.

BACKGROUND OF THE INVENTION

In parent application Ser. No. 447,688, whose entire disclosure is incorporated herein by reference, commutation circuits are disclosed for a brushless D.C. motor, the exemplary motors having two independently energizable windings and per rotor rotation each winding receiving one respective current pulse; or else the winding consists of a single winding but per rotor rotation a first pulse of current is passed through the winding in one direction and then a second pulse in the opposite direction. In both instances there are two winding current paths each containing at least one power transistor switch controlled by a driver transistor switch; when the driver transistor switch assumes its high-output-impedance state the respective power transistor switch is rendered conductive, and when it assumes its low-output-impedance state the respective power transistor switch is rendered non-conductive. Also, the circuits illustrated in the parent case are provided with means for delaying switch-on of the power transistor switches, such that in the course of commutation it does not happen that the power transistor switches in both winding current paths are in conductive state simultaneously.

Although these circuits satisfactorily perform their intended functions, it has been found that they can in advantageous ways be further simplified.

SUMMARY OF THE INVENTION

In accordance with one advantageous simplification contemplated herein, the entire commutation circuit is configured as two mirror-symmetrical halves, and the rotor position sensor generates two output signals each furnished to a respective circuit half or signal channel. Although this does incidentally involve an increase in the number of circuit elements relative to certain circuits disclosed in the parent application, the mirror-symmetrical configuration is particularly well suited for integrated-circuit realization.

In the mirror-symmetrical circuit, the delayed switch-on of the power transistor switches can be implemented using the inherent input-circuit capacitance of these switches, or by providing auxiliary input-circuit capacitors. Alternatively, the delay can be effected by provision of circuit elements which establish the value which the rotor position signal must reach before the driver transistor switches assume their high-output-impedance state. This may make unnecessary the use of discrete capacitors, which is a desirable simplification. Also, such alternative circuit elements may in various ways be made adjustable and externally accessible for adjustment.

The power transistor switches, although turned on and off under the control of the driver transistor switches, may be controlled as to the magnitude of current they carry when turned on by application of an externally furnished control signal, thereby to modify motor rpm in dependence upon such control signal. If the power transistor switches exhibit high gain the control signal can desirably be of low magnitude; otherwise, the control signal can be applied via amplifying elements in a manner which will be clearer in the description, below, of preferred embodiments.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
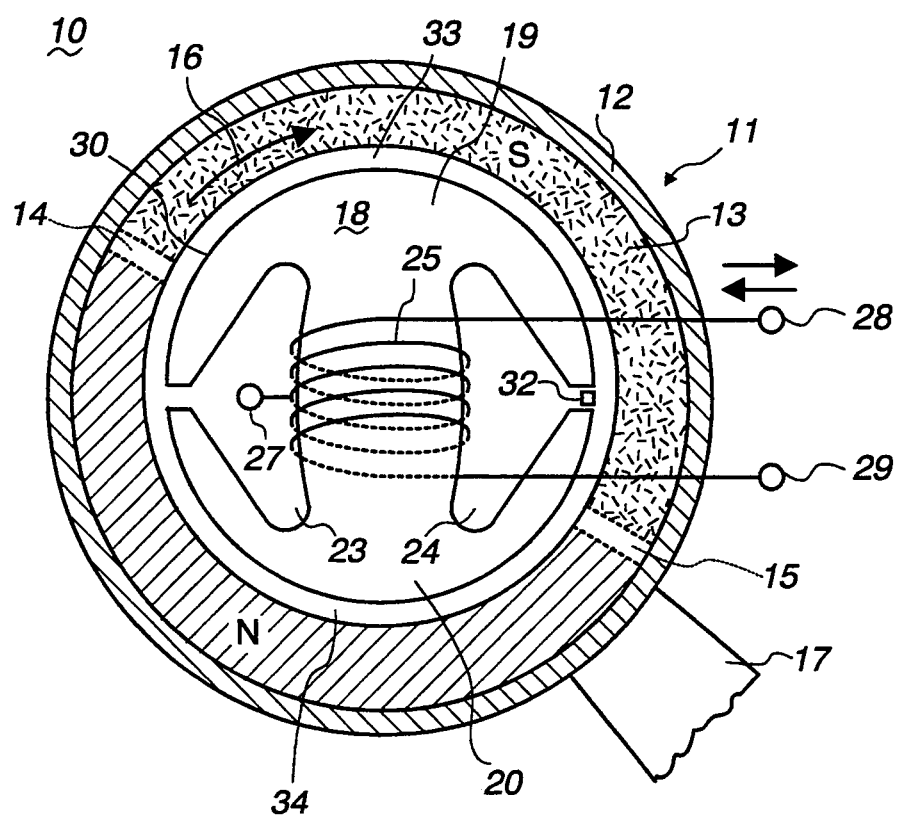
FIG. 1 depicts merely by way of example a motor of a type for which the illustrated commutation circuits may be provided.

FIG. 1 is identical to FIG. 1 of parent application Ser. No. 447,688, to which attention is referred, and depicts a type of brushless D.C. motor, merely by way of example, with which the circuits here illustrated may be used.

Figure 2:
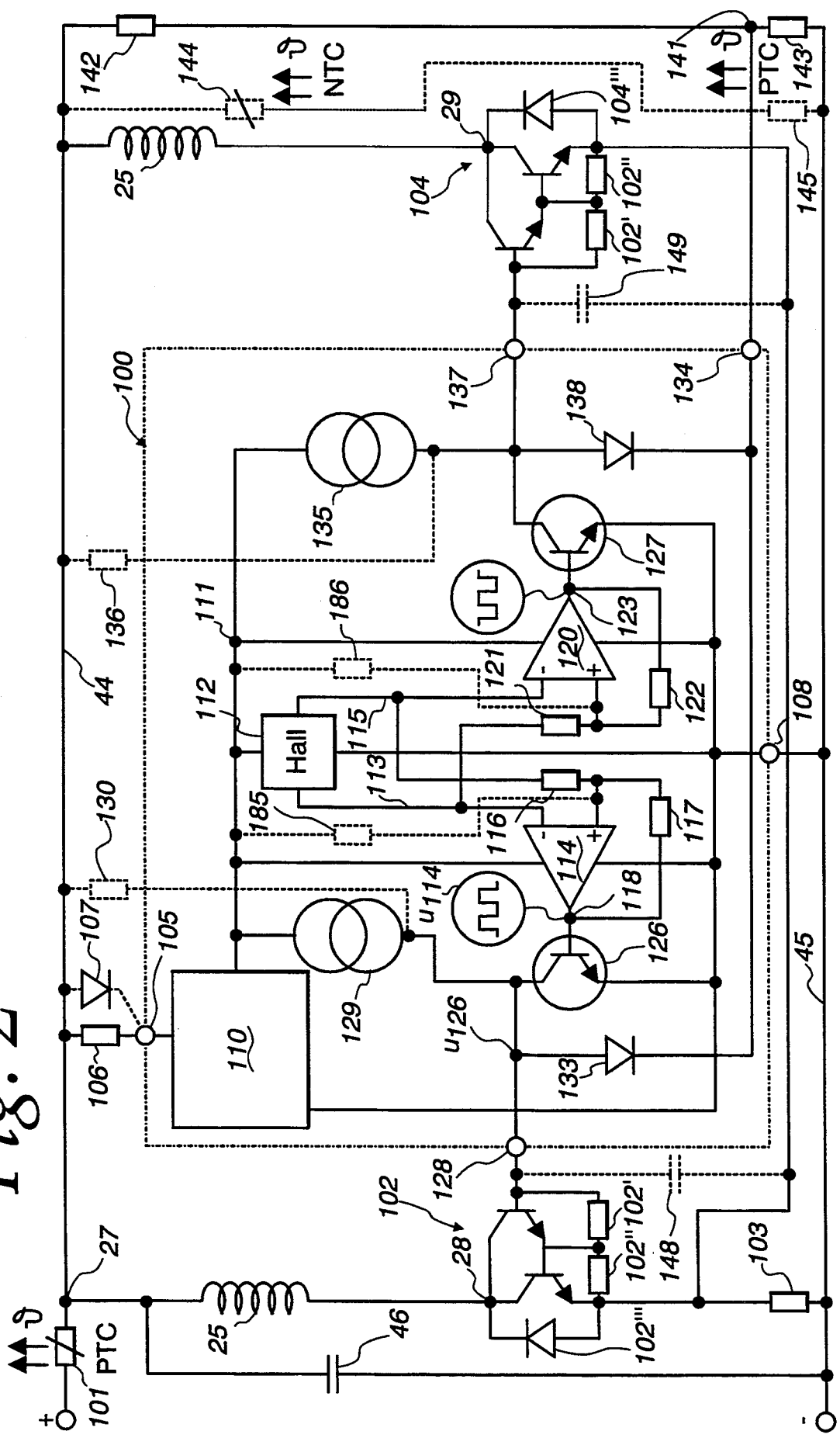
FIG. 2 depicts a first embodiment of an inventive circuit.
Figure 4:
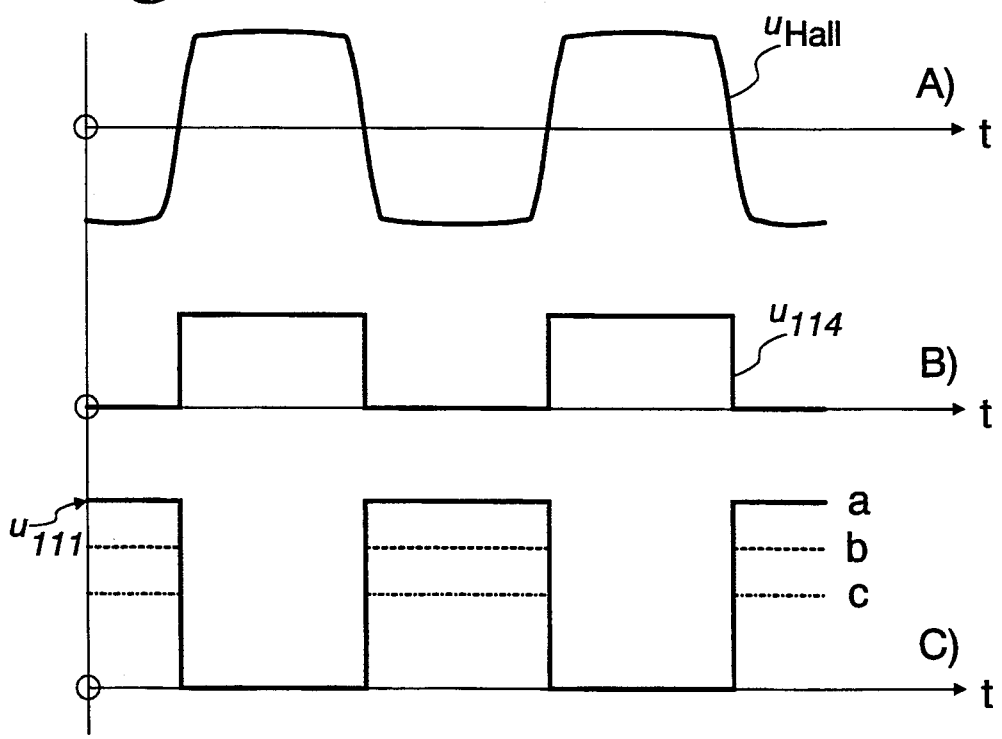
FIG. 4 is a signal diagram referred to in the explanation of the operation of the circuits of FIG. 2 and 3.
Figure 5:
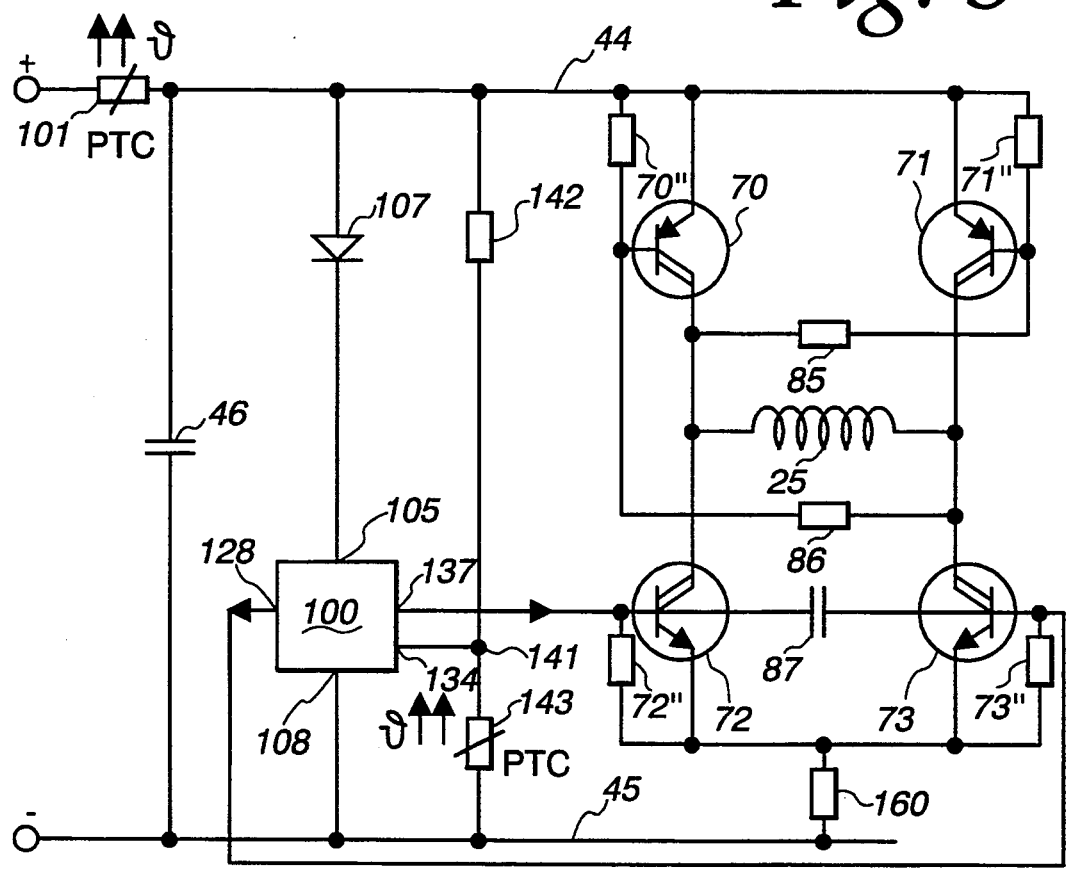
FIG. 5 depicts a commutation circuit in which the portion 100 of the circuit of FIG. 2 is unchanged, but wherein the remainder of the circuit is different from that shown in FIG. 2.

Present FIG. 2 depicts an embodiment of the invention which is an alternative to the control circuits shown in FIGS. 2, 4 and 5 of the parent case. Present FIG. 2 depicts a circuit which can be used with a two-winding-path motor having, merely by way of example, a power of 4 W and an operating voltage between 8 and 30 V; self-evidently the circuit could be designed for higher powers and higher operating voltage values. The commutation circuit is here designed as including a commutation circuit module 100, preferably an IC module because such approach is particularly advantageous for spatial economy for example in the case of compact fan-motors. Circuit module 100 is here designed such that, when incorporated in the complete circuit of present FIG. 2, the connections between the circuit-module terminals and the remaining circuit elements are particularly advantageous relative to the segregation of low-energy and high-energy sections of the complete circuit; in this way, within the circuit module 100 itself, only low power losses are involved. This affords, among other things, an increased efficiency for the motor.

A positive-temperature-coefficient resistor 101 is provided in the positive operating voltage line of the circuit; if the motor is blocked in any way against rotation and therefore is beginning to overheat, PTC resistor 101 serves to lower the effective operating voltage and thereby counteract overheating. One of the stator winding's two current paths has its terminal 27 connected to positive operating voltage line 44 and its terminal 28 to the collector of an npn Darlington transistor 102, whose emitter is connected via a low-resistance resistor 103 (e.g. of between 0.1 and 3 ohms) to the negative operating voltage line 45. The presence of resistor 103 serves to establish a negative-feedback stabilization of the magnitude of the current flowing through the collector-emitter path of power transistor 102, and thus through winding path 25. Resistor 103 is analogously connected between the emitter of a second npn Darlington transistor 104 and negative voltage line 45. The collector of transistor 104 is connected to terminal 29 of winding 25, the winding's center terminal 27 being as shown connected to the positive voltage line 44. Transistors 102 and 104 are provided with base-emitter resistors 102', 102", 104', 104" and with freewheeling diodes 102''', 104'''. By way of example these transistors can be of type BD 679. When one or the other of transistors 102, 104 is conductive, there is produced across resistor 103 a voltage drop which reduces the magnitude of the base-emitter voltage of the conductive transistor, thus implementing a negative-feedback-type stabilizing action. In this way it is prevented that these transistors—for example, in the case they are subjected to different respective temperatures—would carry current of different respective values. These two transistors preferably have high current gain on the order of 1000 to 1500, which is advantageous for reasons which will become clearer below.

Circuit module 100 has its terminal 105 connected to positive voltage line 44 via a resistor 106, or else via a diode 107 (shown in broken lines), or by a non-illustrated series connection of such resistor and diode; and its terminal 108 is connected to negative line 45. Terminal 105 is connected to the accessible operating-voltage terminal of an integrated voltage-regulator stage 110 contained in circuit module 100. Voltage regulator 110 has an output voltage of e.g. 3–5 V; the other accessible operating-voltage terminal of voltage regulator 110 is connected to terminal 108 and thereby to the negative voltage line 45. Voltage regulator 110 furnishes regulated voltage at its output 111.

Circuit module 100 contains a Hall cell 112 having a current input connected to output 111 and another current input connected to terminal 108. The left Hall output 113 is directly connected to the negative input of an operational-amplifier comparator 114, and the right Hall output 115 is connected via a resistor 116 to the positive input of comparator 114. A feedback resistor 117 connects the comparator output 118 to its positive input terminal.

In a manner symmetrical to that just described, Hall output 115 is directly connected to the negative input of an operational-amplifier comparator 120, whereas Hall output 113 is connected via a resistor 121 to the positive input of comparator 120; comparator 120 has a feedback resistor connecting output 123 to the positive input terminal of the comparator. As shown, the comparators 114, 120 have their operating-voltage terminals connected to the negative line terminal 108 and to the regulated output terminal 111.

The output or driver stages of circuit module 100 are constituted by two npn transistors 126 and 127. The base of driver transistor 126 is connected to comparator output 118, and its emitter to negative terminal 108; its collector is connected to module output terminal 108 and, furthermore, connected either (as shown) via an integrated constant-current stage 129 to the regulated-voltage terminal 111, or else (as indicated by broken lines) is connected via a high-resistance resistor 130 to the positive voltage line 44, in which event constant-current source 129 can be omitted. A low magnitude current of for example a few milliamperes (1–5 mA) flows to the collector of transistor 126 via the constant current source 129, or via the resistor 130. Also connected to the collector of transistor 126 is the anode of a diode 133, whose cathode is connected to a terminal 134 of circuit module 100. In a manner described below, module terminal 134 receives a low-energy control signal which can be used to increase or reduce motor speed in dependence upon a sensed or measured quantity, such as some aspect of fan operation when the motor is used for a fan.

In a manner symmetrical to the foregoing, the base of driver transistor 127 is connected to comparator output 123, and its emitter is connected to negative terminal 108. Its collector is connected to the regulated-voltage line 111 via a constant-current stage 135, or alternatively is connected to the positive voltage line 44 via a high-resistance resistor 136. Here likewise, constant current flows to the collector of transistor 127 having a magnitude of a few milliamperes. If the magnitude of this constant current is made smaller, the power loss in circuit module 100 becomes smaller; the motor efficiency becomes higher; and it becomes easier to influence the power furnished to the motor within wide limits by means of a low-magnitude control signal. The collector of driver transistor 127 is connected to output terminal 137 of circuit module 100. Also connected to the collector of transistor 127 is the anode of a diode 138, whose cathode is connected to module terminal 134.

Module terminal 134 is connected to the tap 141 of a voltage divider 142, 143 connected across the positive and negative voltage lines 44, 45 and comprising a fixed resistor 142 and a PTC resistor 143. PTC resistor 143 can for example be located in the air flow of the fan powered by the motor 10. If the air moved by the fan grows warmer, the potential at voltage-divider tap 141 increases, which consequently increases the bias voltage to the base of Darlington transistor 104, motor 10 accordingly receives higher electrical power and its rpm rises, as a result of which a greater air flow rate is established, so as to bring down again the temperature of the air.

Instead of temperature-dependent voltage divider 142, 143, use can be made of a temperature-dependent voltage divider 144, 145 (shown in broken lines) containing a fixed resistor 145 in its lower part and a negative-temperature-coefficient resistor 144 in its upper part. Such alternative voltage divider in principle operates equivalently to divider 142, 143. However, the alternative with PTC resistor 143 is preferred; if resistor 143 is destroyed or fails, terminal 134 will automatically be established at a potential effecting an increase in motor rpm, rather than a decrease.

Connected to module output terminal 128 is the base of a power transistor 102; connected to module output terminal 137 is the base of a power transistor 104. A capacitor 46 is connected between the positive and negative voltage lines 44, 45; it serves to somewhat stabilize the potential difference between these two lines and, importantly, serves to receive and temporarily store energy from one or the other of the two windings 25 during the commutation process.

The illustrated circuit contains relatively few components, namely the two power transistors 102, 104, the capacitor 46 of about 22 microfarads, the integrated-circuit module 100, the resistor 106, and (if provided) the voltage-divider resistors 142, 143 or 144, 145. (The module's control terminal 134 could alternatively be connected to a source of fixed or manually adjustable potential.)

The circuit of FIG. 2 operates as follows:

The circuit module 100 with its Hall cell 112 can, for example in the case of the motor of FIG. 1, be so arranged that Hall cell 112 is at the position of, and replaces, the Hall-IC 32 of FIG. 1, so as to be influenced by the rotor magnet 13. When the rotor 11 turns, there is produced between the outputs 113, 115 of the Hall cell 112 a voltage as shown in FIG. 4A, whose waveform closely simulates the magnetization distribution of the rotor magnet 13. The Hall voltage is applied, e.g., to the comparator 114 and a corresponding rectangular voltage $u_{114}$ shown in FIG. 4B appears at the output of the comparator 114. The rectangular voltage $u_{114}$ controls the driver transistor 126 and a voltage $u_{126}$ shown in FIG. 4C appears at the collector of transistor 126. Actually, the potential level of $u_{126}$ can be clamped by diode 133 at a predetermined (but variable) level. In particular, if the potential at voltage-divider tap 141 is high, diode 133 remains non-conductive and (as shown in FIG. 4C) voltage $u_{126}$ can assume the solid-line level a; this corresponds to a high temperature of the PTC resistor 143, and thus corresponds to maximum motor power being needed. Voltage level a corresponds approximately to the potential level $u_{111}$ produced at regulated-voltage line 111. As already stated, PTC resistor 143 may e.g. be located in the fan's airflow path; if it experiences a relatively lower temperature, then the potential at voltage-divider tap 141 is lower; and voltage $u_{126}$ assumes the lower level b shown in broken lines in FIG. 4C; i.e., the motor 10 receives a corresponding lower level of energization. If the temperature of PTC resistor 143 is very low, there results the low potential level c shown in dash-dot lines in FIG. 4C; i.e., the motor receives even lower current and runs still more slowly. In this way one can effect closed-loop or open-loop control of the motor rpm using very low current for a control signal, of a few milliamperes, i.e., by limiting the excursion of the collector voltages of transistors 126, 127 by means of a common control signal applied to module terminal 134.

To effect delayed switch-on of the power transistors, there can additionally be provided (as shown in broken lines in FIG. 2) a capacitor 148 between the base and emitter of transistor 102 and a capacitor 149 between the base and emitter of transistor 104; these typically can have values between 1 and 10 nanofarads. When driver transistor 126 becomes conductive, capacitor 148 can very quickly discharge in order to render power transistor 102 non-conductive very abruptly. Conversely, when driver transistor 126 becomes non-conductive, power transistor 102 cannot actually become conductive until capacitor 148 charges up to a predetermined level via the constant-current source 129 (or, alternatively, via the high-resistance charging resistor 130); thus, delayed switch-on of power transistor 102 is assured. In certain situations, capacitor 148 may be unnecessary, and the inherent base-emitter capacitance of the power transistors may be sufficient to accomplish a switch-on delay of sufficient duration. On account of the circuit's symmetry, the above remarks apply equally to power transistor 104. In certain situations, the capacitors 148, 149 may be unnecessary, and the inherent base-emitter capacitance of the power transistors 102, 104 may be sufficient to accomplish a switch-on delay of sufficient duration; also, in the case of motors having two windings 25 as in FIG. 1, the desired gap in current flow during commutation need not be of great duration.

The control potential applied to the aforedescribed module terminal 134 can be developed, of course, in various ways, e.g. in dependence upon a pressure value which is to be regulated or stabilized, or in deendence upon air moisture, rpm, etc., etc. If the power transistors 102, 104 are of high current gain, then they can be adequately controlled by means of low base current on the order of a few milliamperes, in which case the voltage divider 142, 143 (or 144, 145) can be of high ohmic resistance, thereby contributing to the motor's efficiency. For this reason the circuit module 100 is particularly well suited for use in conjunction with Darlington transistors of high current gain, or equivalent transistor configurations. Of course, the power-carrying switches, instead of being such high-gain transistors, could be thyristors or SCR's, or the like.

In FIG. 2, instead of implementing the power-transistor switch-on delay by reliance upon inherent base-emitter capacitance or the discrete base-emitter capacitors 148, 149, it is also possible to implement the delay further upstream, i.e., closer to the output voltage of the Hall cell 112. This alternative involves the use of the two resistors 185, 186 shown in broken lines. Resistor 185 is connected between the regulated-voltage line 111 and the positive input of comparator 114; resistor 186 is analogously connected, but to comparator 120. Selection of the values of resistors 185, 186 contributes to establishment, at each comparator's positive input, of the reference level determined at such positive input, and can be so done as to introduce an interval during which both driver transistors 126, 127 are conductive, so that both power transistors 102, 104 be non-conductive. For example, as shown in FIG. 4B, comparator 114 is in the high state during 50% of each rotor rotation, and the other comparator 120 is in the high state during the other 50% of each rotation; this is because comparator 114 is assumed to convert to the high state when the Hall voltage exceeds zero, whereas comparator 120 assumes the high state when the Hall voltage falls below zero. If now by means of resistors 185, 186 the reference levels of the two comparators are somewhat raised, then comparator 114 will not assume the high state until the Hall voltage exceeds zero by a predetermined small amount; and comparator 120 will not assume the high state until the Hall voltage falls below zero by a predetermined small amount. In this way, each comparator 114, 120 will be in the high state for less than 50% of each rotor rotation, so that twice per rotation, namely at the points in time at which commutation is to occur, neither of the two power transistors 102, 104 will be conductive.

Figure 3:
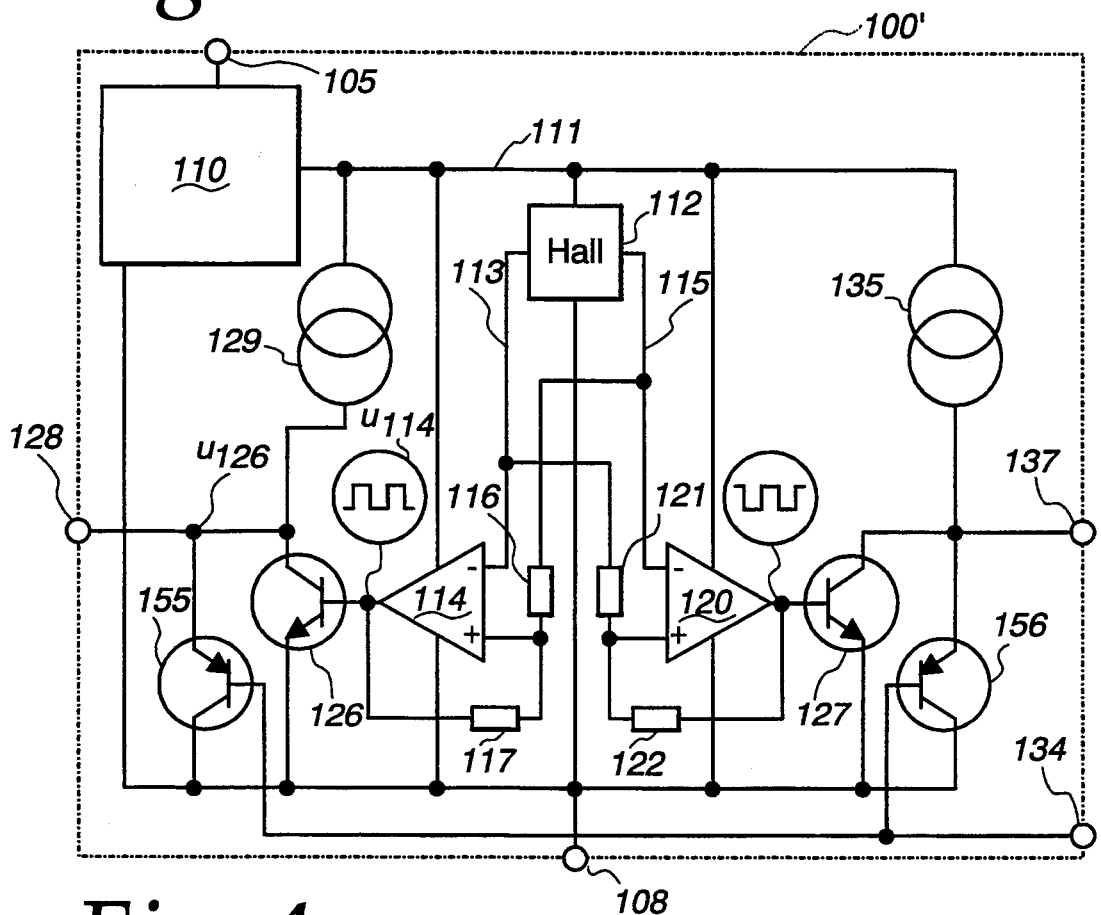
FIG. 3 depicts a modification 100' of the portion 100 of the circuit of FIG. 2.

FIG. 3 depicts a modified circuit module 100' suited where higher output currents are employed. Except for a few differences to be described, module 100' is the same as module 100 of FIG. 2. Elements identical or equivalent to those of FIG. 2 are denoted by the same reference numerals as there, and need not be described a second time.

Instead of the diodes 133, 138 of FIG. 2, there are provided in FIG. 3 two pnp transistors 155, 156 (or their IC equivalents). The emitter of transistor 155 is connected to module output terminal 128; its collector to the module's negative voltage terminal 108; and its base to the module's control signal input terminal 134. Analogously, the emitter of transistor 156 is connected to terminal 137, its collector to terminal 108 and its base to terminal 134. Thus, if the constant-current sources 129, 135 (or 130, 136 of FIG. 2) are dimensioned to carry relatively higher current than in FIG. 2, the control signal applied to module terminal 134 can still be of low magnitude and nevertheless effect clear control of motor power; namely, the transistors 155, 156 will be capable of controllably diverting away a sufficient fraction of the (here relatively higher) collector currents of driver transistors 126, 127.

(The delayed switch-on of the power transistors in FIG. 3 can be effected in any of the three ways shown in FIG. 2; i.e., inherent base-emitter capacitance, or the equivalent, discrete base-emitter capacitance, or the comparator reference resistors 185, 186 of FIG. 2.)

FIG. 5 depicts a motor communication and control circuit which has a configuration which is very similar to that of FIG. 4 of parent application Ser. No. 447,688, to which attention is directed; corresponding elements are denoted by the same reference numerals here as there. The freewheeling diodes 70' to 73' of FIG. 4 of the present case are here omitted for simplicity.

In present FIG. 5 the emitters of the bridge transistors 72 and 73 are connected together and to the negative voltage line 45 via a low-resistance resistor 160 of, e.g., 0.1 to 3 ohms. The base of power transistor 72 is connected to output terminal 137 of circuit module 100; the base of transistor 73 to the terminal 128. The capacitor 87, typically of 0.1-2 nF, in many instances can be eliminated, but here is connected directly between terminals 128 and 137 of circuit module 100, in contrast to present FIG. 2 where between these two terminals there is connected the series connection of capacitors 148 and 149. For this reason the capacitor 87 can be of lower capacitance than capacitors 148 and 149. Operating voltage terminal 105 of circuit module 100 is connected via a diode 107 to the positive voltage line 44, and its terminal 108 is connected to negative line 45. As in present FIG. 2, the tap of the PTC voltage divider 142, 143 is connected to the control terminal 134 of circuit module 100.

The circuit of present FIG. 5 operates in the same way generally as that of FIG. 4 of parent case Ser. No. 447,688. If for example power transistor 73 has been conductive but now becomes non-conductive, the potential at its base is very quickly brought down by the driver transistor 126 internal to module 100 (see present FIG. 2). This change in potential is transmitted by capacitor 87 to the base of power transistor 72, causing the base potential to become more negative than the negative voltage line 45, and thereby holding transistor 72 non-conductive. Then, via constant-current source 135 (or alternatively the resistor 136) substantially constant current flows to the capacitor 87 to reverse the polarity of charge on the latter; after elapse of a certain time, the charge reversal is completed and transistor 72 becomes conductive, as does also the transistor 71. When the communication is proceeding in the opposite sense, the circuit operations proceed in analogous manner, in correspondence to the mirror-symmetrical configuration of the circuit.

Figure 6:
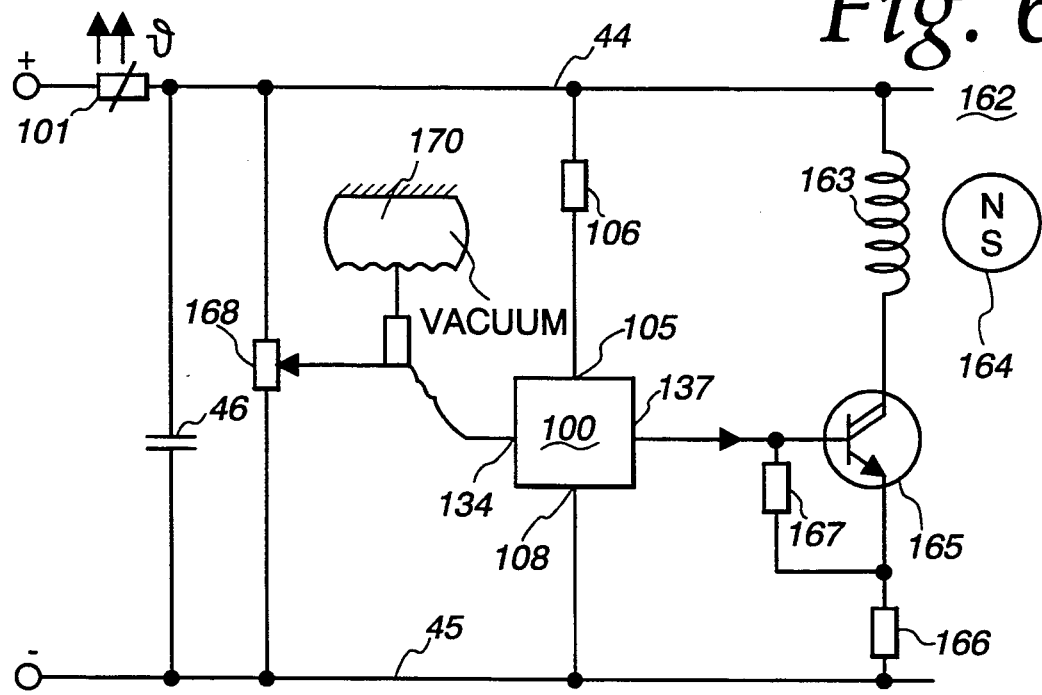
FIG. 6 depicts a control circuit which again incorporates portion 100 of the FIG. 2 circuit but utilizes only half the capabilities of portion 100, for the control of a motor receiving only one, and not two, current pulses per 360°-el. of rotor rotation.

FIG. 6 depicts the use of the circuit module 100 in the communitation of a motor 162 of the type having only a single energizable winding portion, the winding receiving furthermore only a single pulse of current per rotor rotation (or, more generally, per 360°-el. of rotor rotation, for cases where the rotor has more than one pair of poles). Numeral 163 denotes the motor winding, and 164 the rotor. Such motors are disclosed, merely by way of example, in West German published patent application DE-OS 22 60 069 (D37), and are known to persons skilled in the art. Because only one current pulse is required per rotor rotation, only the output terminal 137 of circuit module 100 need be employed; output terminal 128 remains unused, and can (in non-illustrated manner) be connected via a resistor to the negative line 45. Module output terminal 137 is connected to the base of an npn Darlington transistor 165, the collector of Darlington transistor 165 is connected via the winding 163 to positive line 44, and the emitter of Darlington transistor 165 is connected via a low-resistance resistor 166 to the negative line 45 and via a resistor 167 to the base. Connected between the positive and negative voltage lines 44, 45 is a high-resistance potentiometer 168, whose wiper 169 is electrically connected to control terminal 134 of module 100 and mechanically coupled to a barometric transducer 170 which controls the wiper's setting; transducer 170 in conventional manner is an evacuated device. If the ambient pressure rises, potentiometer wiper 169 shifts upwards, the rpm of motor 162 increases, and, e.g., more air is transported by the fan, i.e., assuming the motor is that of a fan. The transducer 170 could instead be, for example, a differential-pressure transducer, or a hygrometric transducer used to cause the motor rpm to automatically rise in response to a rise of air moisture. Still other types of transducer 170 will suggest themselves for various other types of applications.

PTC resistor 101 serves to reduce the motor current to a low value, when as a result of the motor being blocked against rotation overheating begins to occur and the resistance of resistor 101 rises. Diode 107 protects the motor and its circuit from inadvertent wrong-polarity connection to voltage; if the motor and its circuit are wrongly connected to voltage, circuit module 100 receives no current and accordingly cannot be damaged.

Figure 7:
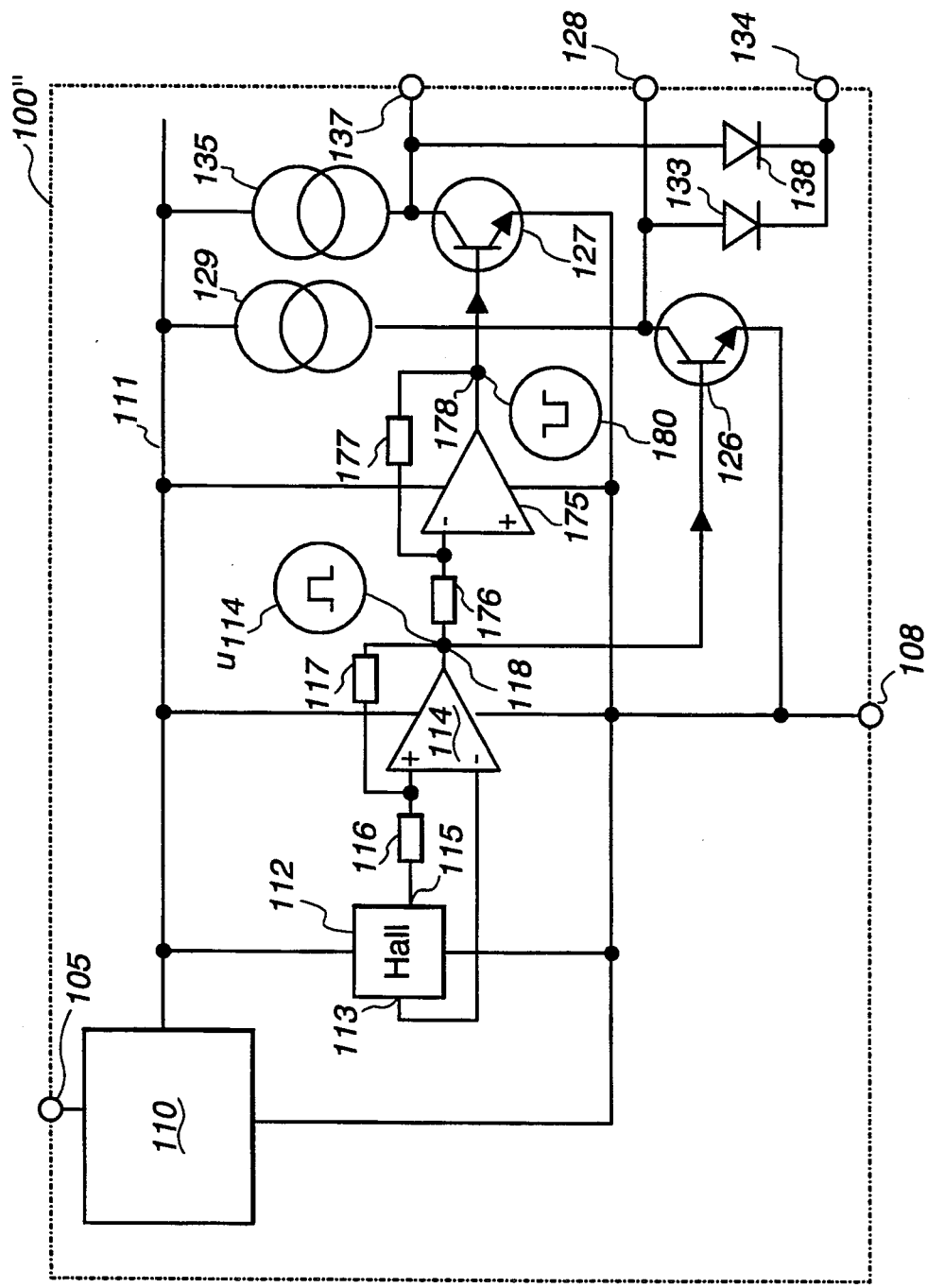
FIG. 7 depicts a second modification 100" of the portion 100 of the circuit of FIG. 2.

FIG. 7 depicts a modified, here unsymmetrical configuration for the integrated commutation circuit module, here denoted 100". Its function is generally the same as that of the circuit modules 100 (present FIG. 2) and 100' (present FIG. 3). Also, its configuration is to a considerable extent similar thereto. The voltage regulator 110 with its output 111 of e.g. 3-5 V, the Hall cell 112 with its outputs 113 and 115, the comparator 114, the one driver stage (i.e., the constant-current source 129 with its current of e.g. 1-5 mA plus the npn driver transistor 126) are configured identically to the left part of the circuit internal to the module 100 of present FIG. 2. Also, the current-diverting diode 133 is identically connected to module output terminal 128. The resistor 116 is here, as in the preceding embodiments, preferably of much lower ohmic value than the feedback resistor 117, e.g. in a ratio from 100:1 to 10:1. (This applies analogously for the resistors 121 and 122 in FIGS. 2 and 3.)

Likewise the other driver stage (constant-current source 135 for e.g. 1–5 mA plus npn driver transistor 127) is the same as in FIG. 2, and likewise the current-diverting diode 138. Also, the external terminals of circuit module 100" are denoted by the same numerals as those of circuit module 100 of FIG. 2, or those of circuit module 100' of FIG. 3, as the operation of these circuit modules (electrical characteristics, signals, operating voltages, etc.) is the same.

However, in FIG. 7, in contrast to FIG. 2, the second comparator 120 is omitted and in its place there is provided a phase inverter stage 175, here having the form of an operational amplifier whose operating-voltage terminals are connected to the regulated-voltage line 111 and to the negative voltage terminal 108. Its inverting input is connected via a resistor 176 to the junction 118, i.e. to the output of comparator 114, and via a resistor 177 is connected to its output 178.

Preferably the resistors 176 and 177 are of about the same resistance value, to establish a gain of about unity. The output 178 of the phase inverter is connected to the base of driver transistor 127 and controls the latter. The phase inverter stage 175 thus effects a phase invertion of the generally rectangular signal $u_{114}$ (at junction 118) as indicated at 180 in FIG. 7. In this way one obtains at the two module output terminals 128, 137 in FIG. 7 two phase-opposed signals, as was the case at the outputs 128, 137 of the module 100 of FIG. 2. Thus, although the module 100" of FIG. 7 has a non-symmetrical configuration, its action is the same, externally, as that of the modules 100 of FIG. 2 and 100' of FIG. 3. Which of these configurations is to be employed depends upon various considerations, including for example considerations of integrated-circuit fabrication in the particular context to be faced.

However, a considerable advantage of the circuits of FIGS. 2 and 3 is that, there, the Hall cell 112 furnishes two separate signals which can then be utilized in two separate signal channels; in contrast, in FIG. 7, the Hall cell 112 is shown as producing but one signal which is used twice, i.e., in both non-inverted and inverted form.

If two separate signals are employed and applied to two comparators 114 and 120, as in FIGS. 2 and 3, then the comparators can be individually set, making it possible to implement either a small time separation between their respective output signals, or else such that one comparator's output signal follow the other's without a gap, or else such that the two comparator output signals actually overlap in time. Naturally, the first of these three possibilities (i.e., time separation) is for many motor types the preferred choice because of the improvement in motor efficiency; this is particularly the case for two-pulse motors, i.e. motors whose stator winding system receives two energizing current pulses per each 360°-el. of rotor rotation.

Present FIG. 2 is an example of this last-mentioned alternative. To this end, the positive input of comparator 114 is connected via a high-resistance resistor 185 to the regulated-voltage output 111 of voltage regulator 110, and the positive input of comparator 120 is likewise connected via a high-resistance resistor 186 to the regulated-voltage line 111. For example, in FIG. 2 the resistor 117 may be about ten to one hundred times greater in its resistance value than resistor 116, and resistor 185 is about two hundred times greater than resistor 116. Similar relationships apply to the corresponding resistors in the other half of this two-half symmetrically configured circuit. In this way comparator 114 does not change state until the potential at Hall output 115 has assumed a value more negative than would be needed without the resistor 185. And conversely, comparator 120 does not change state until the potential at Hall output 113 reaches a value which is more negative than would be needed without the resistor 186. In this simple way there is accomplished the desired time separation between the signals produced at the output terminals 128 and 137. Instead of thusly influencing the comparator's reference levels at the stated input terminals thereof, equivalent influencing could be accomplished at the other inputs of the comparators.

Thus, with the very simple circuit configurations here disclosed one can achieve an optimum of operating capability and reliability. Because of the relatively small number of discrete elements, modules and stages, the illustrated circuits are particularly suited for use in the motors of fans of the type built into electrical and electronic equipment; very frequently, such fans are permitted to have an axial length of about 38 mm, thus leaving within the outlines of the fan's motor very little space for circuit elements. It will be appreciated that the principles of the invention can likewise be employed with circuits incorporating so-called half-bridge power-transistor configurations.

In the embodiments described above, and in the one yet to be described, various alternatives are depicted in broken lines or other set forth. It will be understood that these variousalternatives are not explicitly depicted repetitiously in each successive embodiment, for simplicity; however, where the configuration of one embodiment corresponds in part to that of another, the alternatives depicted or described for one can likewise be employed in the other, and are intended to be so disclosed herein.

Figure 8:
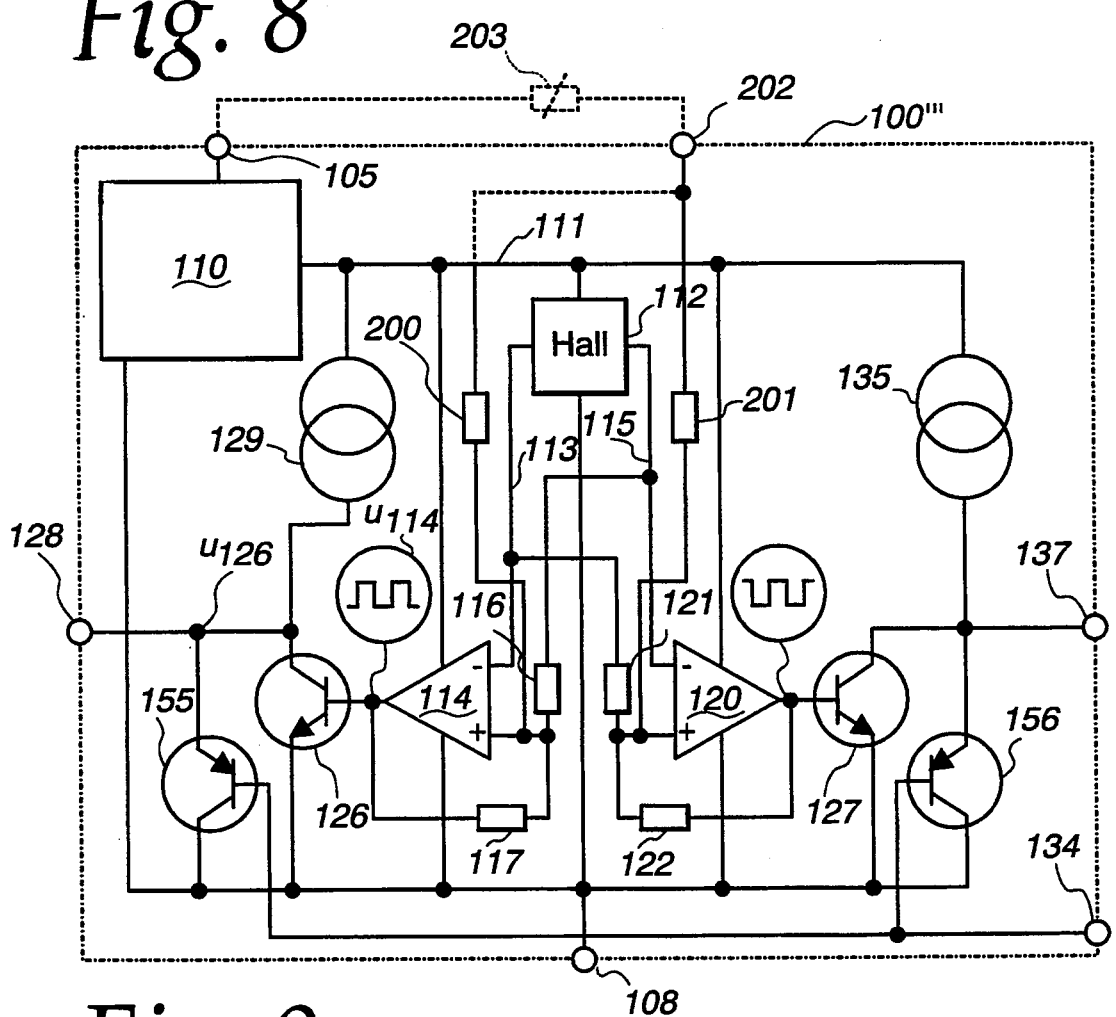
FIG. 8 depicts a third modification 100''' of the portion 100 of the circuit of FIG. 2.
Figure 9:
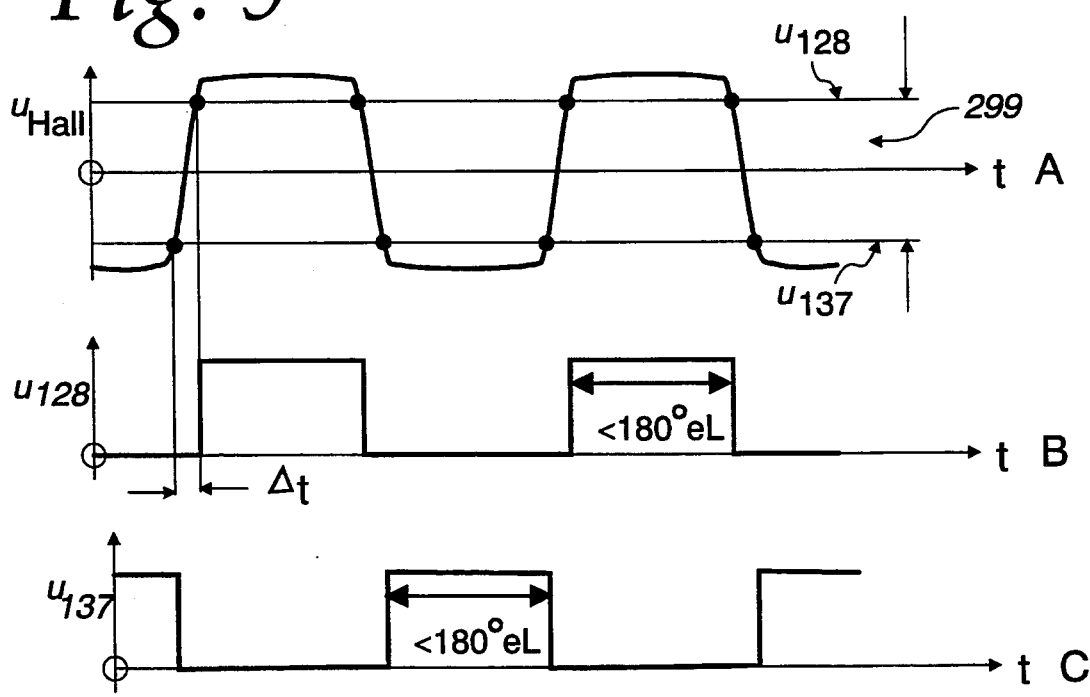
FIG. 9, finally, is a signal diagram referred to in the explanation of the operation of the circuit configuration of FIG. 8.

FIG. 8 depicts a further embodiment very similar to FIG. 3, and thus very similar to FIG. 2 of which FIG. 3 constitutes a modification. FIG. 8 differs from FIG. 3 in the provision of two further resistors 200, 201. The lower terminal of each resistor 200, 201 is connected to the non-inverting input of a respective one of the two comparators 114, 120, and their upper terminals are connected together and to a further input terminal 202 of circuit module 100'''. An external adjustable resistor 203 is connected between the operating-voltage input terminal 105 of voltage regulator 110 and the module terminal 202; the left terminal of resistor 203 is thus connected to the positive voltage line 44 (see e.g. FIG. 2) via for example the resistor 106 (again, see FIG. 2). Adjustment of the resistance value of adjustable resistor 203 modifies the reference potential applied to the positive inputs of the comparators 114, 120. As shown in FIG. 9, line A, the Hall voltage $u_{Hall}$ has one polarity during one half a rotor rotation and the opposite polarity during the other half rotation. Line B in FIG. 9 depicts the output pulses produced at module output terminal 128 under the control of comparator 114; line C depicts the output pulses produced at module output terminal 137 under the control of comparator 120. As shown in lines B and C, the comparator reference potential can be so adjusted that the durations of the output pulses do not correspond to the periods in which the Hall voltage is of one polarity or the opposite polarity; instead, the output pulses can each be made to be of shorter duration than 180°-el., thus establishing a gap between the end of a pulse in line B and the start of a pulse in line C, and likewise between the end of a pulse in line C and the start of a pulse in line B. In line A, $u_{128}$ and $u_{137}$ indicate the comparator reference potentials corresponding to the pulses in lines B and C, and 229 indicates the range of Hall-voltage values within which neither of the module output terminals 128, 137 produces an output pulse. As indicated in line B, each pulse commences delta-t later than the corresponding zero-crossover point of the Hall voltage; and likewise, ends delta-t before the next-following zero-crossover point occurs.

Instead of using the externally accessible, adjustable resistor 203, the two resistors 200, 201 could each be adjustable and externally accessible to produce an equivalent result, but with the additional advantage that the durations of the pulses in line B of FIG. 9 could be selected somewhat independently of those in line C, which may sometimes be helpful in correcting for any tendency of the two symmetrical halves of the module's circuit to operate non-identically. In such case the upper terminals of resistors 200 and 201 could alternatively be connected to the regulated-voltage line 111 and adjustable resistor 203 would not need to be present at all.

It will be understood that each of the elements described above, or two or more together, may also find a useful application in other types of commutation circuits differing from the types described above.

While the invention has been illustrated and described as embodied in motor having improved commutation circuits, it is not intended to be limited to the details shown and described, since various modifications and structural and circuit changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims.

I claim:

1. A brushless direct current motor having a stator provided with at least one stator winding producing an alternating field, the stator winding comprising at least one independently energizable winding path, a permanent magnet rotor, and means for sensing rotor position and generating rotor position signals, the motor furthermore comprising
   first and second power transistor means connected to the stator winding and so connected to the rotor-position-signal-generating means as to be rendered alternately conductive by the latter in order to cause the field from the stator winding to alternate between its two different field orientations,
   the first and second power transistor means having like output electrodes each connected to a common line, and furthermore having like control electrodes; and
   capacitor means connecting the control electrode of the first power transistor means to the control electrode of the second power transistor means in such a fashion that when either one of the power transistor means is in conductive state with the other in non-conductive state, the capacitor means develops across itself a voltage of magnitude and polarity such that when said one and said other power transistor means are thereafter to become, respectively, non-conductive and conductive, said capacitor means voltage acts to initially reverse bias said other power transistor means, thereby delaying assumption by the latter of its conductive state until after said one power transistor means has been non-conductive for a predetermined period of time, whereby to prevent the alternately conductive first and second power transistor means from becoming briefly conductive simultaneously with each other during their interchange of conduction states.

2. A motor as defined in claim 1, said first and second power transistor means respectively comprising a first and a second power transistor, the first and second power transistors being of the same conductivity type, furthermore including third and fourth power transistors of a conductivity type opposite to that of said first and second power transistors, said stator winding comprising a coil having one terminal connected to the collectors of the first and third power transistors and another terminal connected to the collectors of the second and fourth power transistors, whereby to form a four-transistor bridge circuit with said coil being connected in the diagonal of such bridge circuit.

3. A motor as defined in claim 2, furthermore including first and second constant-current sources each connected to the control electrode of a respective one of said first and second power transistors.

4. A motor as defined in claim 2, furthermore including resistor means, said like output electrodes of said first and second power transistors being connected to one terminal of said resistor means whose other terminal is connected to said common line.

5. A motor as defined in claim 1, furthermore including first and second constant-current sources each connected to the control electrode of a respective one of said first and second power transistor means.

6. A motor as defined in claim 1, furthermore including resistor means, said like output electrodes of said first and second power transistor means being connected to one terminal of said resistor means whose other terminal is connected to said common line.

7. Brushless direct current motor having one sensor which operates in accordance with rotor position to supply energizing pulses to adjacent energizing conductors connected in a circuit configured as two mirror-symmetrical halves that operate via amplifying means in a chronological successive manner and employ two lines each connected to a stator winding of the motor, thereby providing zero-power time-intervals of commutation when commutating from one energizing conductor to the next one in sequence, the output voltage of the sensor exhibiting inclined leading edges and inclined trailing edges forming a substantially trapezoidal shaped output signal from the sensor, the amplifying means for commutation purposes being controlled by comparators, the inputs of the comparators being supplied by an output-voltage of the sensor and an adjustable reference voltage, which adjustable reference voltage controls the duration of the zero-power time-intervals of commutation.

8. A motor according to claim 7, wherein the energizing conductors are in a double-line, double-pulse connection on two opposite outputs of a Hall element, and include comparators connected in pairs whose two inputs receive the changing Hall voltage, the comparators connected between a voltage supply from which the switching-on voltage thresholds of the comparators are adjustable by means of a controllable potentiometer.

9. A motor according to claim 8, wherein the adjustable output of the potentiometer is applied to respective positive entry points of the comparators via a resistor each.

* * * * *

UNITED STATES PATENT AND TRADEMARK OFFICE
CERTIFICATE OF CORRECTION

PATENT NO. : 5,349,275
DATED : September 20, 1994
INVENTOR(S) : Rolf Muller

It is certified that error appears in the above-indentified patent and that said Letters Patent is hereby corrected as shown below:

On the title page:

At [30] "Foreign Application Priority Data"

"Dec. 23, 1991 [DE] Fed.Rep. of Germany 3150922"
"Dec. 23, 1991 [DE] Fed.Rep. of Germany 3150923"

should be corrected to:
--Dec. 23, 1981 [DE] Fed.Rep. of Germany 3150922--
--Dec. 23, 1981 [DE] Fed.Rep. of Germany 3150923--.

Signed and Sealed this

Seventeenth Day of October, 1995

Attest:

BRUCE LEHMAN

*Attesting Officer*  *Commissioner of Patents and Trademarks*